US009976604B2

(12) United States Patent
Shiotsu et al.

(10) Patent No.: US 9,976,604 B2
(45) Date of Patent: May 22, 2018

(54) ENGAGEMENT DEVICE AND AUTOMATIC TRANSMISSION

(71) Applicants: KABUSHIKI KAISHA TOYOTA CHUO KENKYUSHO, Nagakute-shi, Aichi-ken (JP); TOYOTA JIDOSHA KABUSHIKI KAISHA, Toyota-shi, Aichi-ken (JP)

(72) Inventors: Isamu Shiotsu, Nagakute (JP); Hirotsugu Yoshino, Susono (JP); Motoki Tabuchi, Mishima (JP); Fusahiro Tsukano, Susono (JP); Takaho Kawakami, Susono (JP); Atsushi Honda, Seto (JP); Seiji Kuwahara, Susono (JP)

(73) Assignees: KABUSHIKI KAISHA TOYOTA CHUO KENKYUSHO, Nagakute-shi (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 353 days.

(21) Appl. No.: 14/982,969

(22) Filed: Dec. 29, 2015

(65) Prior Publication Data

US 2016/0281792 A1    Sep. 29, 2016

(30) Foreign Application Priority Data

Mar. 25, 2015   (JP) ................................ 2015-062738

(51) Int. Cl.
*F16H 3/44*      (2006.01)
*F16D 11/10*     (2006.01)
(Continued)

(52) U.S. Cl.
CPC .............. *F16D 11/10* (2013.01); *F16D 25/02* (2013.01); *F16D 2011/004* (2013.01);
(Continued)

(58) Field of Classification Search
CPC .......... F16C 11/10; F16C 25/02; F16H 3/663; F16H 2200/2007; F16H 2200/2094
(Continued)

(56) References Cited

U.S. PATENT DOCUMENTS 7,992,698 B1 *   8/2011   Hedman .................. F16D 11/10
                                                       192/108
9,109,634 B2 *   8/2015   Tronnberg .............. F16D 28/00
(Continued)

FOREIGN PATENT DOCUMENTS

JP    H01-178261 U    12/1989
JP    H04-073217 U     6/1992
(Continued)

OTHER PUBLICATIONS

Jan. 31, 2017 Office Action issued in Japanese Patent Application No. 2015-062738.

*Primary Examiner* — Ha Dinh Ho
(74) *Attorney, Agent, or Firm* — Oliff PLC (57) ABSTRACT

A translational force Fh to one side in a rotational axis direction is caused to act from a hydraulic piston to a sleeve when an engaged stage between an engagement tooth and an engaged tooth is maintained, so that translation of the sleeve to the other side in the rotational axis direction and consequent disengagement of the engagement tooth and the engaged tooth can be prevented. Therefore, the engaged state between the engagement member and the engaged member can be stably maintained regardless of the condition of the torque acting from the drive source to the engagement member.

6 Claims, 8 Drawing Sheets

(51) Int. Cl.
  *F16D 25/02* (2006.01)
  *F16D 11/00* (2006.01)
  *F16H 3/66* (2006.01)

(52) U.S. Cl.
  CPC ........ *F16D 2011/008* (2013.01); *F16H 3/663* (2013.01); *F16H 2200/0052* (2013.01); *F16H 2200/2007* (2013.01); *F16H 2200/2023* (2013.01); *F16H 2200/2043* (2013.01); *F16H 2200/2064* (2013.01); *F16H 2200/2094* (2013.01)

(58) Field of Classification Search
  USPC .......................................................... 74/325
  See application file for complete search history.

(56) References Cited

U.S. PATENT DOCUMENTS

| | | | |
|---|---|---|---|
| 9,440,532 B1* | 9/2016 | Jongebloed | F16D 13/74 |
| 9,518,613 B2* | 12/2016 | Murata | F16D 11/14 |
| 9,695,889 B2* | 7/2017 | Ebuchi | F16D 48/064 |
| 2009/0325765 A1 | 12/2009 | Humer et al. | |
| 2014/0298790 A1 | 10/2014 | Oita et al. | |

FOREIGN PATENT DOCUMENTS

| | | |
|---|---|---|
| JP | 2010-506113 A | 2/2010 |
| JP | 2014-206250 A | 10/2014 |
| WO | 2013/076827 A1 | 5/2013 |
| WO | 2014/171424 A1 | 10/2014 |

\* cited by examiner

ENGAGEMENT DEVICE AND AUTOMATIC TRANSMISSION

PRIORITY INFORMATION

This application claims priority to Japanese Patent Application No. 2015-062738 filed on Mar. 25, 2015, which is incorporated herein by reference in its entirety.

BACKGROUND

Technical Field

The present invention relates to an engagement device which switches between engagement and disengagement of an engagement element and an engaged element, and to an automatic transmission which has the engagement device.

Related Art

Art related to an engagement device that switches between engagement and disengagement of an engagement element and an engaged element is disclosed in various documents. The engagement device is a self-synchronous shifting clutch (SSS clutch). A switching sleeve rotates at a number of rotations of a vapor turbine until a synchronization number of rotations is reached, and, when the synchronization number of rotations is reached, the switching sleeve is firmly held by a hook in a switching section of a power generator shaft. When the synchronization number of rotations is to be exceeded, the switching sleeve is moved along an axial direction in the direction of the vapor turbine by a screw. After a short time thereof, engagement between a tooth of the switching sleeve and a tooth of the power generator shaft is caused, and torque is transmitted via these teeth. On the other hand, when the number of rotations of the vapor turbine is reduced to a number less than the synchronization number of rotations, the switching sleeve is caused to move along the axial direction in a direction opposite from the vapor turbine by the screw, and the tooth of the switching sleeve and the tooth of the power generator shaft are disengaged from each other, so that the transmission of the torque is discontinued.

In the engagement device described above (SSS clutch), the tooth of the switching sleeve and the tooth of the power generator shaft are engaged to each other by a drive torque from a drive source (vapor turbine). However, when the drive source stops generating the drive torque in an engaged state, the switching sleeve is caused to move along the axial direction in the direction opposite from the vapor turbine by a resistive torque of the drive source, and, consequently, the tooth of the switching sleeve and the tooth of the power generator shaft are disengaged from each other and it becomes impossible to maintain the engaged state. Then, when the drive source again generates the drive torque, the switching sleeve is caused to move along the axial direction in the direction of the vapor turbine, but the transmission of torque is discontinued until the tooth of the switching sleeve and the tooth of the power generator shaft are engaged with each other.

SUMMARY

An engagement device and an automatic transmission according to various aspects of the present invention employ the following means in order to achieve the above-described advantage.

Specifically, according to one aspect of the present invention, there is provided an engagement device comprising: a movable element in which an engagement section is provided; an engagement element in which a support section that supports the movable element is provided; and an engaged element in which an engaged section is provided, wherein a torque from a drive source acts on the engagement element or the engaged element, the support section supports the movable element in a manner such that the movable element moves to one side in a rotational axis direction corresponding to a relative rotation of the engagement element in a predetermined direction with respect to the movable element, the engagement device further comprises an engagement force generation device that causes a force to the one side in the rotational axis direction to act on the movable element, when the movable element is at a predetermined engagement position in the rotational axis direction, the engagement section engages the engaged section and movement of the movable element to the one side in the rotational axis direction with respect to the predetermined engagement position is restrained by a restraining section, and the engagement force generation device causes, when a state of engagement between the engagement section and the engaged section is maintained, the force to the one side in the rotational axis direction to act on the movable element so that the movable element does not move to the other side in the rotational axis direction with respect to the predetermined engagement position.

According to another aspect of the present invention, preferably, the support section is provided on the engagement element in an inclined manner in the predetermined direction from the one side in the rotational axis direction toward the other side with respect to the rotational axis direction, and when the state of engagement between the engagement section and the engaged section is maintained, the force to the one side in the rotational axis direction that the engagement force generation device causes to act on the movable element is greater than Tn×tan (θ)/r, wherein Tn represents a torque in a direction opposite from the predetermined direction acting on the engagement element, r represents a radius of the support section, and θ represents an inclination angle of the support section with respect to the rotational axis direction.

According to another aspect of the present invention, preferably, when the state of engagement between the engagement section and the engaged section is maintained, a torque in the direction opposite from the predetermined direction is caused to act on the engagement element by a resistive torque of the drive source, and, when the state of engagement between the engagement section and the engaged section is maintained, the force to the one side in the rotational axis direction that the engagement force generation device causes to act on the movable element is greater than ρ×Tr×tan (θ)/r, wherein Tr represents the resistive torque of the drive source, and ρ represents a torque ratio between the engagement element and the drive source.

According to another aspect of the present invention, preferably, the engagement device further comprises a disengagement force generation device that causes a force to the other side in the rotational axis direction to act on the movable element, wherein, when the state of engagement between the engagement section and the engaged section is maintained, the force to the one side in the rotational axis direction that the engagement force generation device causes to act on the movable element is greater than Fs+Tn×tan (θ)/r, wherein Fs represents a force to the other side in the rotational axis direction that the disengagement force generation device causes to act on the movable element.

According to another aspect of the present invention, there is provided an automatic transmission which gear-changes a motive power from a drive source and outputs the motive power, and in which a gear stage can be selected from among a plurality of gear stages, comprising: a brake device that allows or restrains rotation of a rotational member to which a torque from the drive source acts, wherein the brake device restrains the rotation of the rotational member at a first gear stage among the plurality of gear stages and allows the rotation of the rotational member at a second gear stage among the plurality of gear stages, the brake device is the above-described engagement device, one of the engagement element and the engaged element is connected to the rotational member, and a rotation of the other of the engagement element and the engaged element is fixed, and, when the first gear stage is maintained, the engagement force generation device causes the force to the one side in the rotational shaft direction to act on the movable element such that the movable element does not move to the other side in the rotational axis direction with respect to the predetermined engagement position. The first gear stage can be arbitrarily set from among the plurality of gear stages, and the second gear stage can be arbitrarily set from among the plurality of gear states so long as the gear stage differs from the first gear stage.

According to various aspects of the present invention, the engagement force generation device causes the force to the one side in the rotational axis direction to act on the movable element so that the movable element does not move to the other side in the rotational axis direction with respect to the predetermined engagement position when the state of engagement between the engagement section and the engaged section is maintained, and thus, it is possible to stably maintain the state of engagement between the engagement section and the engaged section regardless of the condition of the torque of the drive source.

DESCRIPTION OF EXEMPLARY EMBODIMENTS

A preferred embodiment of the present invention (hereinafter also referred to as "embodiment") will now be described with reference to the drawings.

Figure 1:
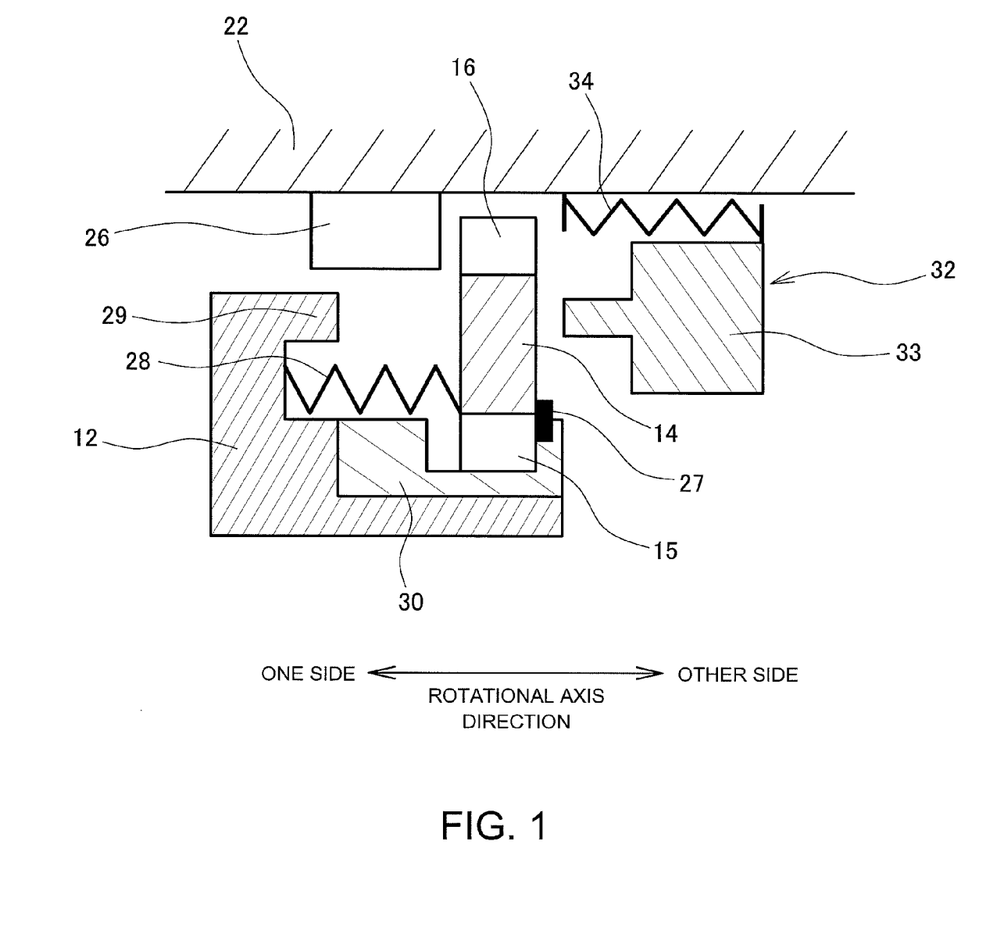
FIG. 1 is a diagram schematically showing a structure of an engagement device according to a preferred embodiment of the present invention.
Figure 2:
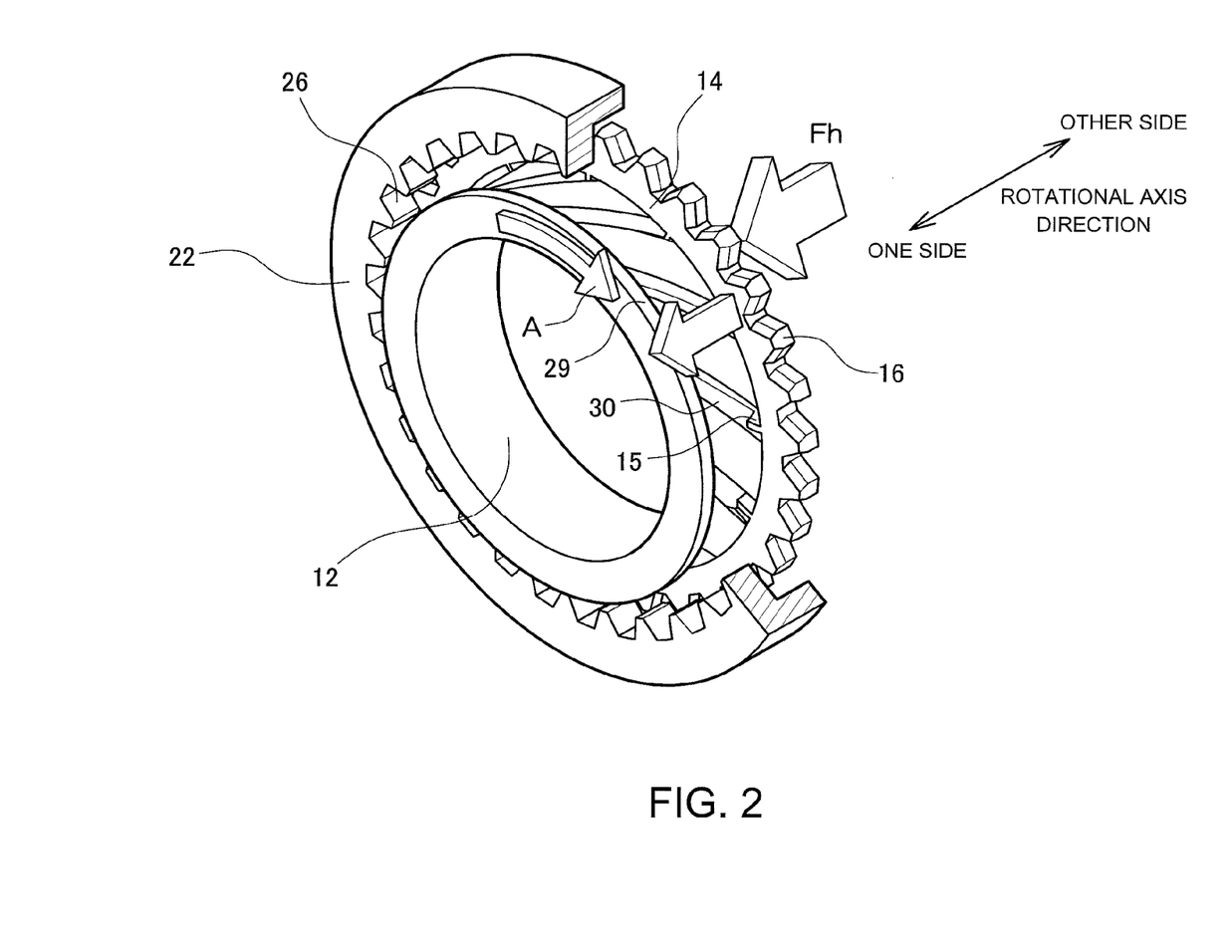
FIG. 2 is a diagram schematically showing a structure of an engagement device according to a preferred embodiment of the present invention.
Figure 3:
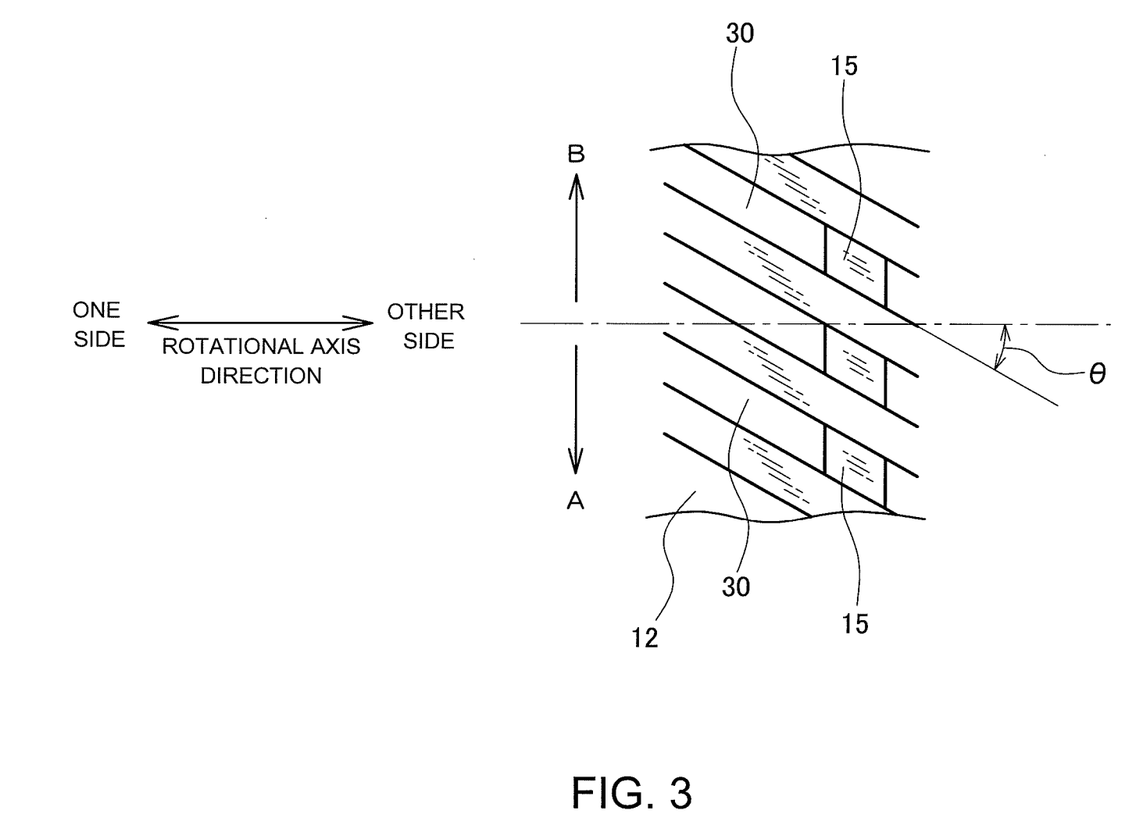
FIG. 3 is a diagram schematically showing a structure of an engagement device according to a preferred embodiment of the present invention.

FIGS. 1-3 are diagrams schematically showing a structure of an engagement device according to a preferred embodiment of the present invention. FIG. 1 is a cross sectional diagram of main structures viewed from a direction orthogonal to central axes of an engagement member 12 and an engaged member 22, FIG. 2 is a perspective view of the engagement member 12, a sleeve 14, and the engaged member 22, and FIG. 3 is a development view developed along a circumferential direction of an outer circumferential surface of the engaged member 22. On the engagement member (engagement element) 12, a torque from a drive source such as an engine or a motor (not shown), for example, acts via a transmission mechanism (not shown). When the drive source generates a drive torque, the drive torque of the drive source acts on the engagement member 12 via the transmission mechanism, and, when the drive source does not generate the drive torque, a resistive torque of the drive source acts on the engagement member 12 via the transmission mechanism. The engagement member 12 is rotatable in a predetermined direction (direction of an arrow A in FIGS. 2 and 3) and a direction opposite from the predetermined direction (a direction of an arrow B in FIG. 3). A translation of the engagement member 12 in relation to a rotational axis direction (left-and-right direction of FIG. 1) is fixed. On the outer circumference of the engagement member 12, a screw groove (support section) 30 for supporting the sleeve (movable member) 14 is formed. The screw groove 30 is formed in an inclined manner in a predetermined direction (direction of the arrow A in FIG. 3) from one side (left side of FIG. 3) toward the other side (right side of FIG. 3) with respect to the rotational axis direction. FIGS. 1-3 show an example configuration where the screw groove 30 is a right-hand helix screw groove.

On the inner circumference of the sleeve 14, a plurality of supported sections 15 are provided with a space from each other (with equal spacing) in a circumferential direction, and, by each supported section 15 being fitted with the screw groove 30, the sleeve 14 is supported on the engagement member 12. Because each supported section 15 of the sleeve 14 is movable along a direction of extension of the screw groove 30, the sleeve 14 can move relative to the engagement member 12 along the screw groove 30. Further, on the outer circumference of the sleeve 14, a plurality of engagement teeth (engagement sections) 16 are provided with a space from each other (with equal spacing) in the circumferential direction.

The engaged member (engaged element) 22 is placed on an outer circumferential side of the engagement member 12, coaxial with the engagement member 12. A rotation of the engaged member 22 is fixed, and a translation of the engaged member 22 with respect to the rotational axis direction is also fixed. On an inner circumference of the engaged member 22, a plurality of engaged teeth (engaged sections) 26 are provided with a space from each other (with equal spacing as the engagement teeth 16) in the circumferential direction. The engagement teeth 16 of the sleeve 14 are placed opposing the engaged teeth 26 of the engaged member 22 in the rotational axis direction, and can be engaged with the engaged teeth 26 of the engaged member 22.

Figure 4:
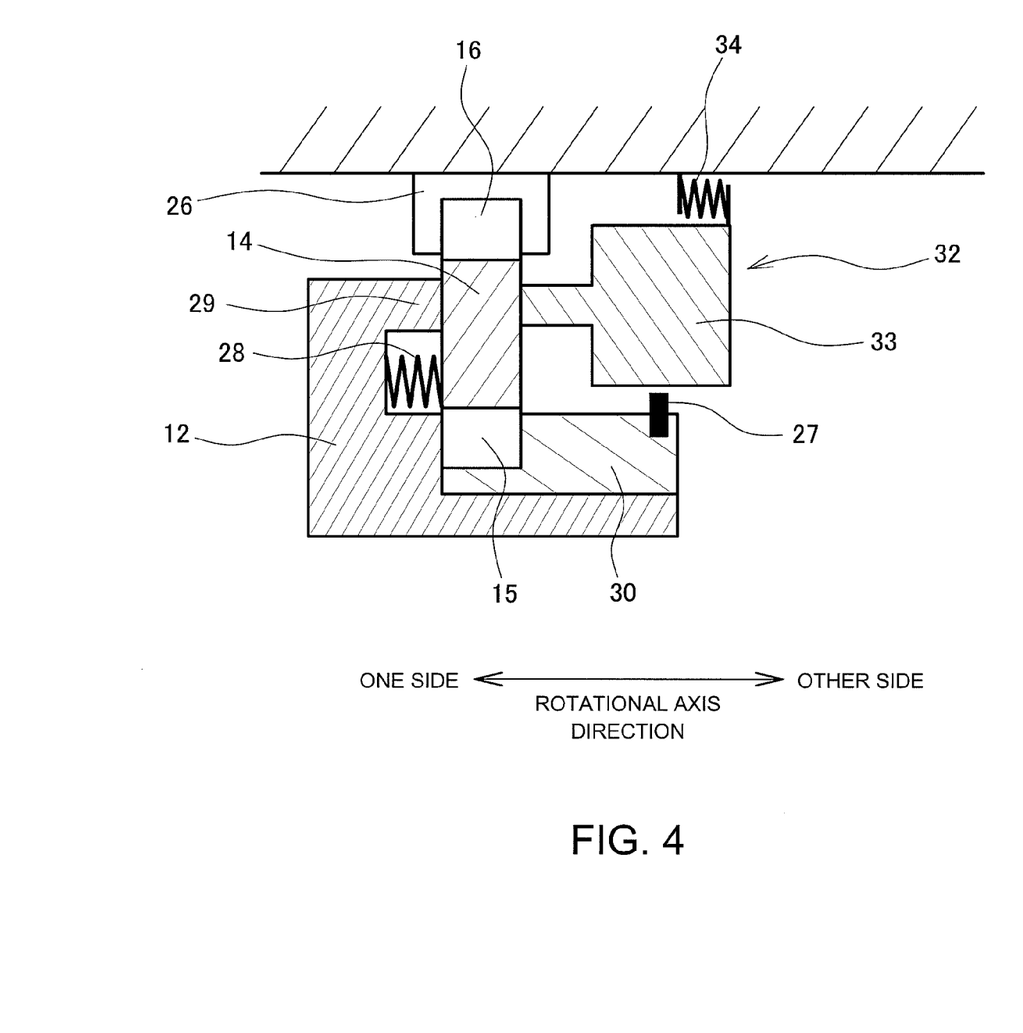
FIG. 4 is a diagram for explaining an operation of an engagement device according to a preferred embodiment of the present invention.

When the engagement member 12 relatively rotates in a predetermined direction with respect to the sleeve 14 such as, for example, when the engagement member 12 rotates in the predetermined direction with the rotation of the sleeve 14 stopped, the relative rotational movement of the engagement member 12 with respect to the sleeve 14 is converted to a translation of the sleeve 14 along the rotational axis direction, so that the sleeve 14 translates to the one side in the rotational axis direction. On the other hand, when the engagement member 12 relatively rotates in a direction opposite from the predetermined direction with respect to the sleeve 14 such as, for example, when the engagement member 12 rotates in the direction opposite from the predetermined direction with the rotation of the sleeve 14 stopped, the sleeve 14 is translated to the other side in the rotational axis direction. As shown in FIG. 4, when the sleeve 14 is at a predetermined engagement position in the rotational axis direction, the engagement tooth 16 of the sleeve 14 is engaged with the engaged tooth 26 of the engaged member 22. On the other hand, when the sleeve 14 is at a disengagement position on the other side in the rotational axis direction with respect to the predetermined engagement position, the engagement tooth 16 of the sleeve 14 is not engaged with the engaged tooth 26 of the engaged member 22.

On the one side in the rotational axis direction with respect to the sleeve 14 in the engagement member 12, a stopper (restraining section) 29 is provided, and the translation of the sleeve 14 to the one side in the rotational axis direction with respect to the predetermined engagement position is restrained by the stopper 29. A stopper 27 is provided also at the other side in the rotational axis direction with respect to the sleeve 14 in the engagement member 12, and the translation of the sleeve 14 to the other side in the rotational axis direction from the disengagement position is restrained by the stopper 27.

An actuator (engagement force generation device) 32 comprises, for example, a hydraulic actuator having a hydraulic piston 33, and presses the hydraulic piston 33 to the one side in the rotational axis direction by a hydraulic force generated by a hydraulic pump, to cause a translational force Fh to the one side in the rotational axis direction to act from the hydraulic piston 33 to the sleeve 14. On the hydraulic piston 33, a return spring 34 having elasticity is attached in the rotational axis direction. The return spring 34 causes an urging force to the other side in the rotational axis direction to act on the hydraulic piston 33. On the one side in the rotational axis direction with respect to the sleeve 14 in the engagement member 12, a spring (disengagement force generation device) 28 having elasticity is attached in the rotational axis direction. The spring 28 causes a translational force Fs to the other side in the rotational axis direction to act on the sleeve 14.

Next, an operation of the engagement device according to the present embodiment will be described, in particular, an operation to switch between engagement and disengagement between the engagement member 12 and the engaged member 22.

As shown in FIG. 1, when the hydraulic piston 33 of the actuator 32 does not cause the translational force Fh to the one side in the rotational axis direction to act on the sleeve 14 and the sleeve 14 is in the disengagement position in the rotational axis direction, the engagement tooth 16 of the sleeve 14 is not engaged with the engaged tooth 26 of the engaged member 22. In this case, the engagement member 12 and the engaged member 22 are in a disengaged state, and the rotation of the engagement member 12 is allowed.

In order to transition the engagement member 12 and the engaged member 22 from the disengaged state to the engaged state, the translational force Fh to the one side in the rotational axis direction is caused to act from the hydraulic piston 33 of the actuator 32 to the sleeve 14, to translate the sleeve 14 from the disengagement position to the one side in the rotational axis direction. When the sleeve 14 translates to the one side in the rotational axis direction while pressing the spring 28, as shown in FIG. 5, the engagement tooth 16 of the sleeve 14 starts to engage the engaged tooth 26 of the engaged member 22.

Figure 6:
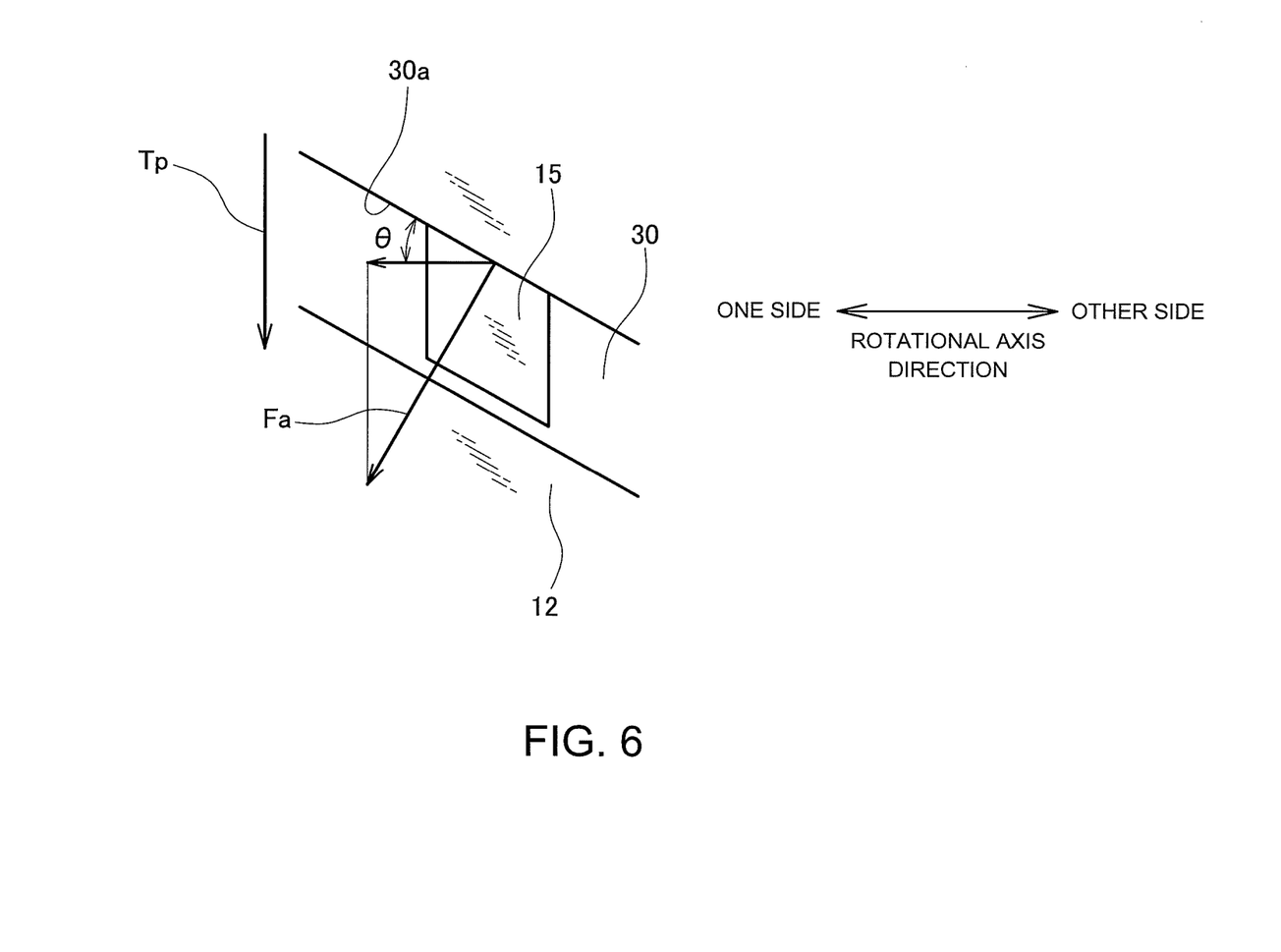
FIG. 6 is a diagram for explaining an operation of an engagement device according to a preferred embodiment of the present invention.

Here, as shown in FIG. 6, when a torque Tp in the predetermined direction (direction of arrow A of FIGS. 2 and 3) is acting on the engagement member 12, the supported section 15 of the sleeve 14 contacts a side surface 30a on a side opposite from the predetermined direction in the screw groove 30, so that a pressing force (reaction force) Fa acts from the side surface 30a of the screw groove 30 to the supported section 15. The pressing force Fa acting on the supported section 15 has a component to the one side in the rotational axis direction, and thus, a translational force Fp to the one side in the rotational axis direction corresponding to the torque Tp acts on the sleeve 14. When a radius of the screw groove 30 (distance between rotation center axis of the engagement member 12 and the screw groove 30) is r and an inclination angle of the screw groove 30 with respect to the rotational axis direction is θ (refer to FIG. 3), Fp is represented by the following Equation (1). If a torque ratio between the engagement member 12 and the drive source is represented by ρ, and when the torque Tp in the predetermined direction acts on the engagement member 12 by the drive torque Td of the drive source, Tp=ρ×Td. On the other hand, when the torque Tp in the predetermined direction acts on the engagement member 12 by the resistive torque Tr of the drive source, Tp=ρ×Tr.

$$Fp = Tp \times \tan(\theta)/r \qquad \text{(Equation 1)}$$

Figure 5:
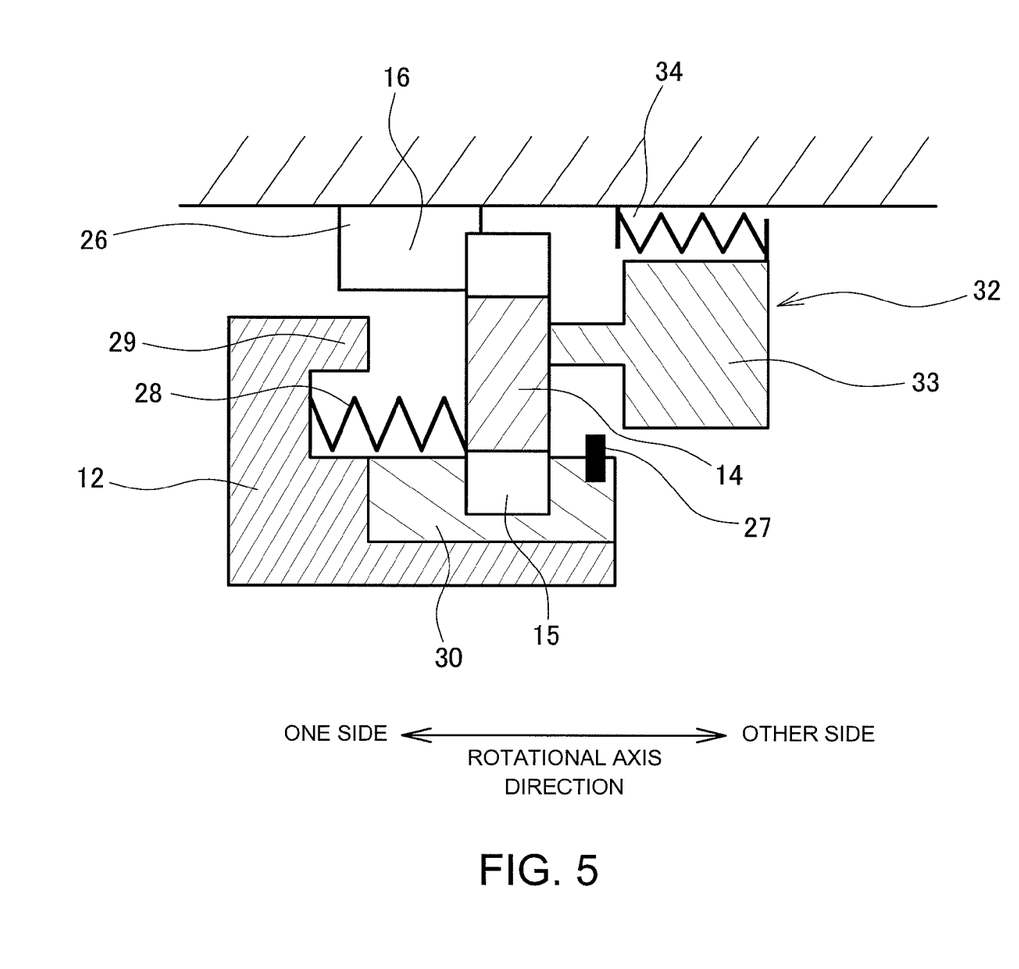
FIG. 5 is a diagram for explaining an operation of an engagement device according to a preferred embodiment of the present invention.

Therefore, when the torque Tp in the predetermined direction acts on the engagement member 12 by the drive torque Td or the resistive torque Tr of the drive source, the translational force Fh to the one side in the rotational axis direction may act from the hydraulic piston 33 to the sleeve 14 in a manner to satisfy the following Equation (2), to enable the sleeve 14 to further translate from the position of FIG. 5 to the one side in the rotational axis direction. In this process, with regard to the direction of the torque acting on the engagement member 12, for example, the direction may be detected using a torque sensor. When the drive source is an engine, for example, the drive torque Td of the engine can be calculated from the fuel injection amount or the like. The resistive torque Tr of the engine (drag torque) includes sliding resistance of a piston side surface and a seal, rolling resistance of a bearing, stirring resistance of the engine oil, intake/outtake loss or the like, and, for example, it is possible to measure in advance the torque necessary for maintaining the rotational speed of the engine a constant. When the torque Tp in the predetermined direction acting on the engagement member 12 is large such as when the drive torque Td generated by the drive source is large, and the condition of Fs<Fp=Tp×tan (θ)/r is satisfied, the sleeve 14 can be further translated from the position of FIG. 5 to the one side in the rotational axis direction, even without causing the translational force Fh to the one side in the rotational axis direction to act from the hydraulic piston 33 to the sleeve 14 (Fh=0).

$$Fh > Fs - Fp = Fs - Tp \times \tan(\theta)/r \qquad \text{(Equation 2)}$$

Figure 7:
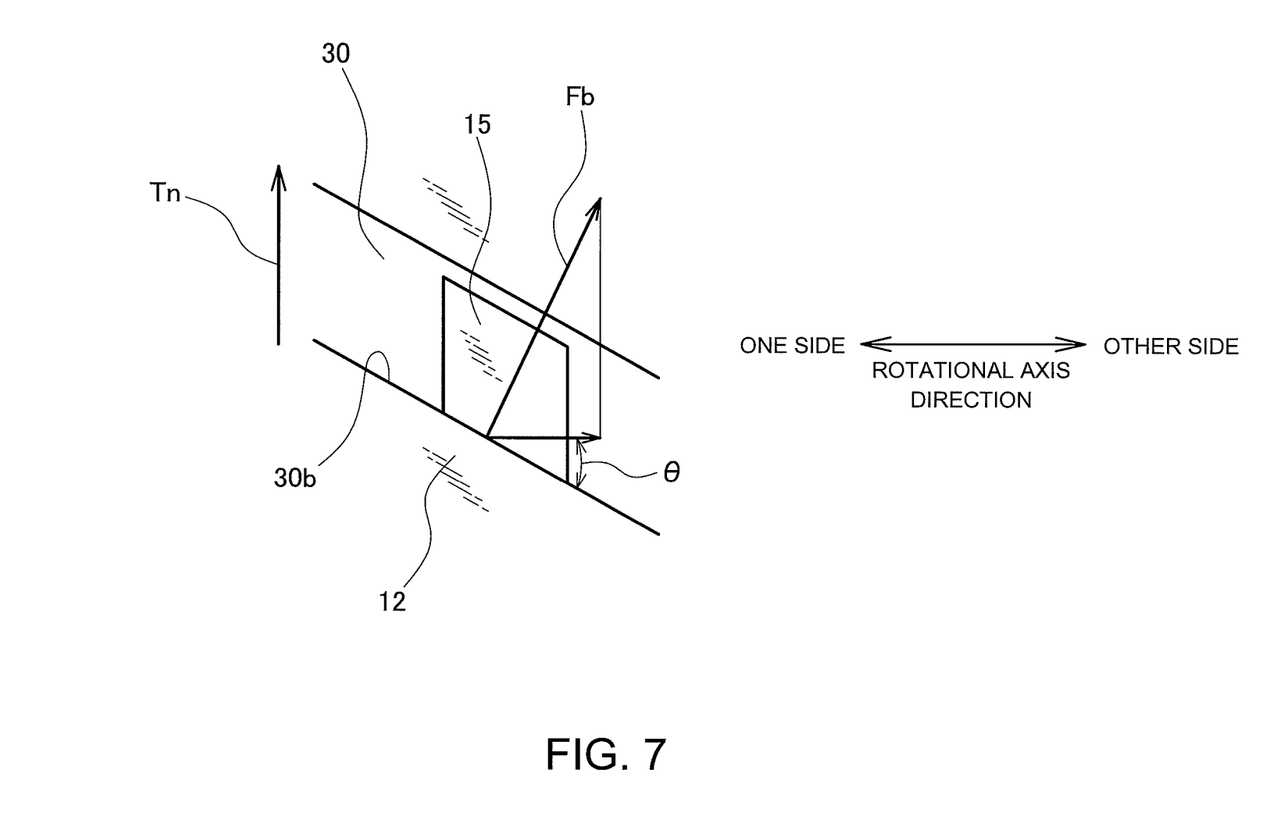
FIG. 7 is a diagram for explaining an operation of an engagement device according to a preferred embodiment of the present invention.

On the other hand, when the torque Tn in a direction opposite from the predetermined direction (direction of arrow B in FIG. 3) acts on the engagement member 12 as shown in FIG. 7, the supported section 15 of the sleeve 14 contacts a side surface 30b on the predetermined direction side of the screw groove 30, so that a pressing force (reactive force) Fb acts from the side surface 30b of the screw groove 30 to the supported section 15. Because the pressing force Fb acting on the supported section 15 has a component to the other side in the rotational axis direction, a translational force Fn to the other side in the rotational axis direction corresponding to the torque Tn acts on the sleeve 14. Fn is represented by the following Equation (3). When the torque Tn in the direction opposite from the predetermined direction acts on the engagement member 12 by the drive torque Td of the drive source, Tn=ρ×Td. On the other hand, when the torque Tn in the direction opposite from the predetermined direction acts on the engagement member 12 by the resistive torque Tr of the drive source, Tn=ρ×Tr.

$$Fn = Tn \times \tan(\theta)/r \qquad \text{(Equation 3)}$$

Therefore, when the torque Tn in the direction opposite from the predetermined direction acts on the engagement member 12 by the drive torque Td or the resistive torque Tr of the drive source, the translational force Fh to the one side in the rotational axis direction may be caused to act from the hydraulic piston 33 to the sleeve 14, in a manner to satisfy the following Equation (4), so that the sleeve 14 can be further translated to the one side in the rotational axis direction from the position of FIG. 5.

$$Fh > Fs + Fn = Fs + Tn \times \tan(\theta)/r \qquad \text{(Equation 4)}$$

Alternatively, when the sleeve 14 is translated from the position of FIG. 5 to the one side in the rotational axis direction, it is possible to cause the translational force Fh to the one side in the rotational axis direction to act from the hydraulic piston 33 to the sleeve 14 in a manner to satisfy Equation (4), regardless of the direction of the torque acting on the engagement member 12.

When the sleeve 14 translates from the position of FIG. 5 to the one side in the rotational axis direction while pressing the spring 28, the rotation of the sleeve 14 is restrained by the engaged tooth 26 of the engaged member 22, and the engagement member 12 rotates in the predetermined direction. Because of this, when the rotational direction of the engagement member 12 is in the direction opposite from the predetermined direction in the disengaged state of the engagement member 12 and the engaged member 22, the rotational direction of the engagement member 12 is inverted when the engagement tooth 16 of the sleeve 14 starts to engage with the engaged tooth 26 of the engaged member 22.

When the sleeve 14 translates to the one side in the rotational axis direction to the predetermined engagement position where the engagement tooth 16 of the sleeve 14 completely engages with the engaged tooth 26 of the engaged member 22 as shown in FIG. 4, the sleeve 14 contacts the stopper 29 so that the translation of the sleeve 14 to the one side in the rotational axis direction with respect to the predetermined engagement position is restrained. With this process, the rotation of the engagement member 12 is fixed, and the engagement member 12 and the engaged member 22 are set in the engaged state.

When the engaged state between the engagement member 12 and the engaged member 22 (engaged state where the engagement tooth 16 completely engages with the engaged tooth 26) is maintained, if the torque Tp (=ρ×Td) in the predetermined direction acts on the engagement member 12 by the drive torque Td generated by the drive source, the translational force Fh to the one side in the rotational axis direction may act from the hydraulic piston 33 to the sleeve 14 in a manner to satisfy Equation (2), so that the sleeve 14 does not translate to the other side in the rotational axis direction with respect to the predetermined engagement position.

On the other hand, if the drive source does not generate the drive torque Td and the torque Tn (=ρ×Tr) in the direction opposite from the predetermined direction acts on the engagement member 12 by the resistive torque Tr of the drive source when the engaged state between the engagement member 12 and the engaged member 22 is maintained, the translational force Fh to the one side in the rotational axis direction may be acted from the hydraulic piston 33 to the sleeve 14 in a manner to satisfy Equation (4), so that the sleeve 14 does not translate from the predetermined engagement position to the other side in the rotational axis direction.

Thus, if the torque Tp (=ρ×Td) in the predetermined direction acts on the engagement member 12 by the drive torque Td of the drive source and the torque Tn (=ρ×Tr) in the direction opposite from the predetermined direction acts on the engagement member 12 by the resistive torque Tr of the drive source when the engaged state in which the engagement tooth 16 completely engages the engaged tooth 26 is maintained, the translational force Fh to the one side in the rotational axis direction is caused to act from the hydraulic piston 33 to the sleeve 14 in a manner to satisfy the following Equation (5). Because the resistive torque Tr of the drive source is smaller compared to the drive torque Td, it is possible to prevent the translation of the sleeve 14 from the predetermined engagement position to the other side in the rotational axis direction with a smaller translational force Fh, regardless of the direction of the torque acting on the engagement member 12.

$$Fh > Fs + \rho \times Tr \times \tan(\theta)/r \qquad \text{(Equation 5)}$$

When the engagement member 12 and the engaged member 22 are to be transitioned from the engaged state to the disengaged state, the translational force Fh to the one side in the rotational axis direction to act from the hydraulic piston 33 to the sleeve 14 is set to 0. When the drive source does not generate the drive torque Td and the torque Tn (=ρ×Tr) in the direction opposite from the predetermined direction acts on the engagement member 12 by the resistive torque Tr of the drive source, a translational force (Fs+ρ×Tr×tan (θ)/r) to the other side in the rotational axis direction acts on the sleeve 14, and the sleeve 14 translates to the other side in the rotational axis direction with respect to the predetermined engagement position. In this process, the rotation of the sleeve 14 is restrained by the engaged tooth 26 of the engaged member 22, and the engagement member 12 rotates in the direction opposite from the predetermined direction. When the sleeve 14 translates to the other side in the rotational axis direction to the disengagement position, the engagement between the engagement tooth 16 of the sleeve 14 and the engaged tooth 26 of the engaged member 22 is completely released, the engagement member 12 and the engaged member 22 are set in the disengaged state, and the rotation of the engagement member 12 is allowed. By setting the translational force Fh to 0 in advance when the torque Tp (=ρ×Td) in the predetermined direction acts on the engagement member 12 by the drive torque Td of the drive source, to translate the hydraulic piston 33 to the other side in the rotational axis direction, it becomes possible to prevent pressing of the hydraulic piston 33 by the sleeve 14 when the sleeve 14 translates to the other side in the rotational axis direction by the translational force (Fs+ρ×Tr×tan (θ)/r), and to quickly disengage the engagement between the engagement member 12 and the engaged member 22.

If the torque Tn (=ρ×Td) in the direction opposite from the predetermined direction acts on the engagement member 12 by the drive torque Td generated by the drive source when the engaged state between the engagement member 12 and the engaged member 22 is maintained, the translational force Fh to the one side in the rotational axis direction may act from the hydraulic piston 33 to the sleeve 14 in a manner to satisfy Equation (4), so that the sleeve 14 does not translate from the predetermined engagement position to the other side in the rotational axis direction.

On the other hand, if the drive source does not generate the drive torque Td and the torque Tp (=ρ×Tr) in the predetermined direction acts on the engagement member 12 by the resistive torque Tr of the drive source when the engaged state between the engagement member 12 and the engaged member 22 is maintained, the translational force Fh to the one side in the rotational axis direction may act from the hydraulic piston 33 to the sleeve 14 in a manner to satisfy Equation (2), so that the sleeve 14 does not translate from the predetermined engagement position to the other side in the rotational axis direction.

Here, when the engaged state in which the engagement tooth 16 completely engages the engaged tooth 26 is maintained, if the torque Tn (=ρ×Td) in the direction opposite from the predetermined direction acts on the engagement member 12 by the drive torque Td of the drive source and the torque Tp (=ρ×Tr) in the predetermined direction acts on the engagement member 12 by the resistive torque Tr of the drive source, a translational force Fh to the one side in the rotational axis direction acts from the hydraulic piston 33 to the sleeve 14 in a manner to satisfy the following Equation (6).

$$Fh > Fs + \rho \times Td \times \tan(\theta)/r \qquad \text{(Equation 6)}$$

When the engagement member 12 and the engaged member 22 are transitioned from the engaged state to the disengaged state, the translational force Fh to the one side in the rotational axis direction to act from the hydraulic piston 33 to the sleeve 14 is set to 0. When the drive source does not generate the drive torque Td and the torque Tp (=ρ×Tr) in the predetermined direction acts on the engagement member 12 by the resistive torque Tr of the drive source, a translational force (Fs−ρ×Tr×tan(θ)/r) to the other side in the rotational axis direction acts on the sleeve 14, and the sleeve 14 translates from the predetermined engagement position to the other side in the rotational axis direction, and the engagement between the engagement tooth 16 of the sleeve 14 and the engaged tooth 26 of the engaged member 22 is released. In this process, the translational force Fs of the spring 28 is designed such that a condition of Fs>ρ×Tr×tan (θ)/r is satisfied. In this manner, the engagement device of the present embodiment functions as a brake device which allows or restrains the rotation of the engagement member 12.

According to the engagement device of the present embodiment described above, when the engaged state between the engagement tooth 16 and the engaged tooth 26 is maintained, by causing the translational force Fh to the one side in the rotational axis direction to act from the hydraulic piston 33 to the sleeve 14, it becomes possible to prevent translation of the sleeve 14 to the other side in the rotational axis direction and consequent disengagement of the engagement tooth 16 and the engaged tooth 26. Therefore, the engaged state between the engagement member 12 and the engaged member 22 can be stably maintained regardless of the condition of torque acting from the drive source to the engagement member 12. For example, when the torque Tp (=ρ×Td) in the predetermined direction acts on the engagement member 12 by the drive torque Td of the drive source and the torque Tn (=ρ×Tr) in the direction opposite from the predetermined direction acts on the engagement member 12 by the resistive torque Tr of the drive source, the translational force Fh to the one side in the rotational axis direction may act from the hydraulic piston 33 to the sleeve 14 in a manner to satisfy Equation (5), so that the engaged state between the engagement member 12 and the engaged member 22 can be stably maintained with a small translational force, regardless of the direction of the torque acting from the drive source to the engagement member 12. As a result, the work of the hydraulic pump can be reduced.

When the translational force Fh is set to 0 and the engagement member 12 and the engaged member 22 are transitioned from the engaged state to the disengaged state, if the torque Tn (=ρ×Tr) in the direction opposite from the predetermined direction acts on the engagement member 12 by the resistive torque Tr of the drive source, the translational force (Fs+ρ×Tr×tan(θ)/r) to the other side in the rotational axis direction acts on the sleeve 14, and thus, the engagement member 12 and the engaged member 22 can be disengaged from each other. In this process, if the translational force Fh is set to 0 in advance when the torque Tp (=ρ×Td) in the predetermined direction acts on the engagement member 12 by the drive torque Td of the drive source, is becomes possible to prevent pressing of the hydraulic piston 33 by the sleeve 14 when the sleeve 14 translates to the other side in the rotational axis direction, and to quickly disengage the engagement member 12 and the engaged member 22.

In addition, when the engagement member 12 and the engaged member 22 are transitioned from the disengaged state to the engaged state, if the torque Tp in the predetermined direction acts on the engagement member 12, by setting the translational force Fh to the one side in the rotational axis direction acting from the hydraulic piston 33 to the sleeve 14 to satisfy Equation (2), it becomes possible to quickly engage the engagement member 12 and the engaged member 22 with a small translational force Fh, and to reduce the work of the hydraulic pump. On the other hand, when the torque Tn in the direction opposite from the predetermined direction acts on the engagement member 12, by setting the translational force Fh to the one side in the rotational axis direction acting from the hydraulic piston 33 to the sleeve 14 to satisfy Equation (4), it becomes possible to engage the engagement member 12 and the engaged member 22 even when the translational force Fn to the other side (disengagement side) in the rotational axis direction acts on the sleeve 14 by the torque Tn.

In the above-described embodiment, the spring 28 is used as the disengagement force generation device which causes the translational force Fs to the other side in the rotational axis direction to act on the sleeve 14. Alternatively, in the present embodiment, an actuator may be used as the disengagement force generation device, to cause the translational force Fs to the other side in the rotational axis direction to act on the sleeve 14. In this case, when the translational force Fh to the one side in the rotational axis direction is to act from the hydraulic piston 33 to the sleeve 14 such as when the engagement member 12 and the engaged member 22 are transitioned from the disengaged state to the engaged state or when the engaged state between the engagement member 12 and the engaged member 22 is to be maintained, the translational force Fs to the other side in the rotational axis direction does not act from the actuator (disengagement force generation device) to the sleeve 14 (Fs=0). In this process, as the condition for the translational force Fh to the one side in the rotational axis direction to act from the hydraulic piston 33 to the sleeve 14, conditions may be considered in which Fs is set to 0 (Fs=0) in Equations (2), and (4)-(6). Alternatively, in the present embodiment, a common actuator may be used as the engagement force generation device which causes the translational force Fh to the one side in the rotational axis direction to act on the sleeve 14 and as the disengagement force generation device which causes the translational force Fs to the other side in the rotational axis direction to act on the sleeve 14.

Alternatively, in the present embodiment, the rotation of the engagement member 12 may be fixed, and the drive torque and the resistive torque of the drive source may act on the engaged member 22, and the engaged member 22 may be rotatable in the predetermined direction and a direction opposite from the predetermined direction. In this case, the engagement device according to the present embodiment acts as a brake device which allows or restrains rotation of the engaged member 22.

Alternatively, in the present embodiment, the drive torque and the resistive torque of the drive source may act on the engagement member 12 or the engaged member 22, and both the engagement member 12 and the engaged member 22 may be rotatable in the predetermined direction and the direction opposite from the predetermined direction. In this case, the engagement device according to the present embodiment functions as a clutch device that connects or disconnects the motive power between the engagement member 12 and the engaged member 22.

Figure 8:
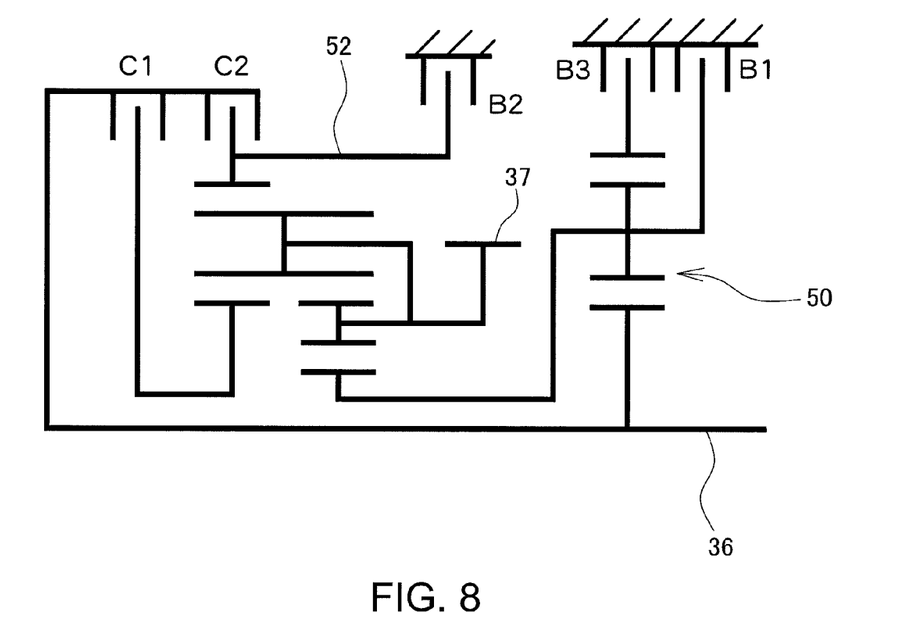
FIG. 8 is a diagram schematically showing a structure of an automatic transmission according to a preferred embodiment of the present invention.
Figure 9:
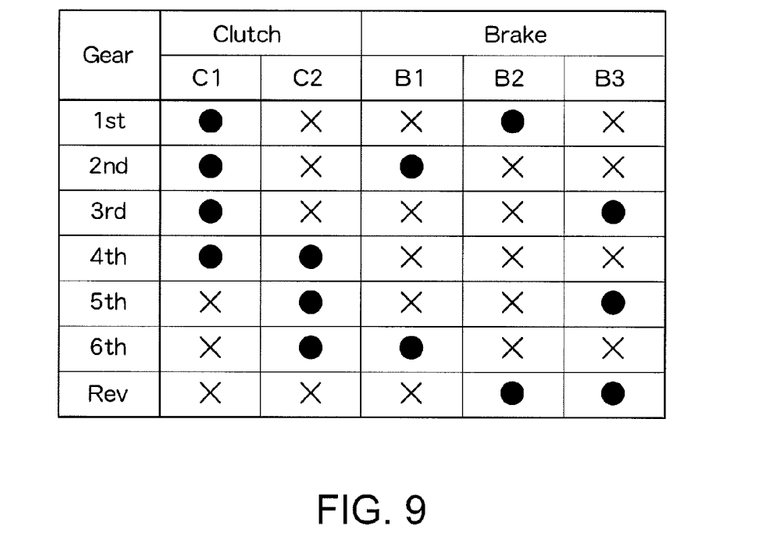
FIG. 9 is a diagram showing engaged/disengaged states of clutch devices C1 and C2 and brake devices B1, B2, and B3 in each gear stage of the automatic transmission.

Alternatively, the engagement device according to the present embodiment may be applied for an automatic transmission. FIG. 8 shows an example configuration of an automatic transmission having the engagement device according to the present embodiment. The automatic transmission is a stepped transmission in which a plurality of gear stages can be selected. The automatic transmission comprises a planetary gear mechanism 50 having a plurality of degrees of freedom of rotation, and a plurality of clutch devices C1 and C2 and brake devices B1, B2, and B3 for limiting the degree of freedom of the rotation of the planetary gear mechanism 50, and is equipped in a vehicle, for example. The automatic transmission selectively engages the clutch devices C1 and C2 and the brake devices B1, B2, and B3 according to the gear stage such that a number of the degrees of freedom of rotation of the planetary gear mechanism is one degree of freedom, to gear-change the motive power which is input from the drive source (engine) to the input shaft 36 with a gear ratio according to the gear stage, and to output the resulting power from an output member 37. As shown in FIG. 9, 6 forward gears (1st-6th) and 1 reverse gear (Rev) are realized having different gear ratios (=rotational speed of the input shaft 36/rotational speed of the output member 37) from each other according to the engagement/disengagement states of the clutch devices C1 and C2 and the brake devices B1, B2, and B3. In FIG. 9, a • mark (black circle) represents the engaged state and an X represents the disengaged state. In the automatic transmission according to the present embodiment, the structure of the planetary gear mechanism 50, the numbers of the clutch devices and the brake devices, and the number of gear stages may be arbitrarily designed.

Each of the clutch devices C1 and C2 is formed from, for example, a frictional clutch, and each of the brake devices B1, and B3 is formed from, for example, a frictional brake. On the other hand, the brake device B2 is formed from the engagement device according to the present embodiment described above. The brake device (engagement device) B2 allows or restrains the rotation of a ring gear (rotational member) 52 of the planetary gear mechanism 50. For example, the engagement member 12 is connected to the ring gear 52 and the rotation of the engaged member is fixed. Alternatively, the engaged member 22 may be connected to the ring gear 52 and the rotation of the engagement member 12 may be fixed. A torque from the drive source (engine) acts on the ring gear 52.

As shown in FIG. 9, by controlling the clutch device C1 and the brake device (engagement device) B2 to the engaged state and the clutch device C2 and the brake devices B1 and B3 to the disengaged state, a first speed gear stage (first gear stage) is selected. In the first speed gear stage, the engagement device B2 is in the engagement state in which the rotations of the ring gear 52 and the engagement member 12 are restrained, a torque Tp (=ρ×Td) in the predetermined direction (direction of an arrow A in FIGS. 2 and 3) acts on the ring gear 52 and the engagement member 12 by a drive torque Td of the engine at the time of switching ON of the acceleration, and a torque Tn (=ρ×Tr) in the direction (direction of an arrow B of FIG. 3) opposite from the predetermined direction acts on the ring gear 52 and the engagement member 12 by a resistive torque (drag torque) Tr of the engine at the time of switching OFF of the acceleration.

By controlling the clutch device C1 and the brake device B1 in the engaged state and the clutch device C2 and the brake devices B2 and B3 in the disengaged state, a second speed gear stage (second gear stage) is selected. In the second speed gear stage, the engagement device B2 is in the disengaged state in which the rotations of the ring gear 52 and the engagement member 12 are allowed, the ring gear 52 and the engagement member 12 rotate in the direction opposite from the predetermined direction, a torque Tn (=ρ×Td) in the direction opposite from the predetermined direction acts on the ring gear 52 and the engagement member 12 by the drive torque Td of the engine at the time of switching ON of the acceleration, and a torque Tp (=ρ×Tr) in the predetermined direction acts on the ring gear 52 and the engagement member 12 by the resistive torque Tr of the engine at the time of switching OFF of the acceleration.

When down-shifting from the second speed gear stage to the first speed gear stage, the brake device B1 is switched from the engaged state to the disengaged state, and the engagement device B2 is switched from the disengaged state to the engaged state. At the start of the engagement between the engagement tooth 16 of the sleeve 14 and the engaged tooth 26 of the engaged member 22, when the torque Tp in the predetermined direction is acting on the engagement member 12, the translational force Fh to the one side in the rotational axis direction may act from the hydraulic piston 33 to the sleeve 14 in a manner to satisfy Equation (2), so that the sleeve 14 may be translated to the one side in the rotational axis direction to the predetermined engagement position. On the other hand, when the torque Tn in the direction opposite from the predetermined direction is acting on the engagement member 12, the translational force Fh to the one side in the rotational axis direction may act from the hydraulic piston 33 to the sleeve 14 in a manner to satisfy Equation (4), so that the sleeve 14 may be translated to the one side in the rotational axis direction to the predetermined engagement position. When the sleeve 14 is translated to the one side in the rotational axis direction to the predetermined engagement position, the translational force Fh to the one side in the rotational axis direction may act from the hydraulic piston 33 to the sleeve 14 in a manner to satisfy Equation (4), regardless of the direction of the torque acting on the engagement member 12.

When the first speed gear stage is to be maintained, the engaged state of the engagement device B2 is maintained. In this case, for example, the translational force Fh to the one side in the rotational axis direction acts from the hydraulic piston 33 to the sleeve 14 in a manner to satisfy Equation (5). With such a configuration, it becomes possible to prevent, with a small translational force Fh, translation of the sleeve 14 to the other side in the rotational axis direction from the predetermined engagement position, regardless of the direction of the torque acting on the engagement member 12.

When up-shifting from the first speed gear stage to the second speed gear stage, the brake device B1 is switched from the disengaged state to the engaged state, and the engagement device B2 is switched from the engaged state to the disengaged state. In this case, the translational force Fh to the one side in the rotational axis direction to act from the hydraulic piston 33 to the sleeve 14 is set to 0. In the process of switching the brake device B1 from the disengaged state to the engaged state, a torque Tn in the direction opposite from the predetermined direction acts on the engagement member 12 and a translational force $(Fs+\rho \times Tr \times \tan(\theta)/r)$ to the other side in the rotational axis direction acts on the sleeve 14. With such a configuration, the sleeve 14 translates to the other side in the rotational axis direction, and the engagement between the engagement tooth 16 of the sleeve 14 and the engaged tooth 26 of the engaged member 22 is released. By setting the translational force Fh to 0 in advance immediately before the switching of the brake device B1 from the disengaged state to the engaged state, it becomes possible to prevent pressing of the hydraulic piston 33 by the sleeve 14 when the sleeve 14 translates to the other side in the rotational axis direction by the translational force $(Fs+\rho \times Tr \times \tan(\theta)/r)$, and to quickly disengage the engagement member 12 and the engaged member 22.

By controlling the brake devices B2 and B3 to the engaged state and the clutch devices C1 and C2 and the brake device B1 to the disengaged state, a reverse gear stage (backward movement gear stage) is selected. In the reverse gear stage, the engagement device B2 is in the engaged state in which the rotations of the ring gear 52 and the engagement member 12 are restrained, a torque Tn $(=\rho \times Td)$ in the direction opposite from the predetermined direction acts on the ring gear 52 and the engagement member 12 by the drive torque Td of the engine at the time of switching ON of the acceleration, and a torque Tp $(=\rho \times Tr)$ in the predetermined direction acts on the ring gear 52 and the engagement member 12 by the resistive torque Tr of the engine at the time of switching OFF of the acceleration.

When the device is switched from neutral in which all of the clutch devices C1 and C2 and the brake devices B1, B2, and B3 are in the disengaged state to the reverse gear stage, the brake devices B2 and B3 are switched from the disengaged state to the engaged state. At the start of the engagement between the engagement tooth 16 of the sleeve 14 and the engaged tooth 26 of the engaged member 22, when a torque Tp in the predetermined direction is acting on the engagement member 12, a translational force Fh to the one side in the rotational axis direction may act from the hydraulic piston 33 to the sleeve 14 in a manner to satisfy Equation (2), so that the sleeve 14 may be translated to the one side in the rotational axis direction to the predetermined engagement position. On the other hand, when the torque Tn in the direction opposite from the predetermined direction is acting on the engagement member 12, a translational force Fh to the one side in the rotational axis direction may act from the hydraulic piston 33 to the sleeve 14 in a manner to satisfy Equation (4), so that the sleeve 14 can be translated to the one side in the rotational axis direction to the predetermined engagement position. Alternatively, when the sleeve 14 is translated to the one side in the rotational axis direction to the predetermined engagement position, a translational force Fh to the one side in the rotational axis direction may act from the hydraulic piston 33 to the sleeve 14 in a manner to satisfy Equation (4), regardless of the direction of the torque acting on the engagement member 12.

When the reverse gear stage is to be maintained, the engaged state of the engagement device B2 is maintained. In this case, for example, a translational force Fh to the one side in the rotational axis direction acts from the hydraulic piston 33 to the sleeve 14 in a manner to satisfy Equation (6). With this configuration, it becomes possible to prevent translation of the sleeve 14 to the other side in the rotational axis direction with respect to the predetermined engagement position regardless of the direction of the torque acting on the engagement member 12.

When the device is switched from the reverse gear stage to neutral, the brake devices B2 and B3 are switched from the engaged state to the disengaged state. In this case, the translational force Fh to the one side in the rotational axis direction to act from the hydraulic piston 33 to the sleeve 14 is set to 0. A translational force $(Fs-\rho \times Tr \times \tan(\theta)/r)$ to the other side in the rotational axis direction acts on the sleeve 14 at the time of switching OFF of the acceleration in which a torque Tp $(=\rho \times Tr)$ in the predetermined direction acts on the engagement member 12 by the resistive torque Tr of the engine. The sleeve 14 translates to the other side in the rotational axis direction, and the engagement between the engagement tooth 16 of the sleeve 14 and the engaged tooth 26 of the engaged member 22 is released.

According to the automatic transmission described above, by using the engagement device according to the present embodiment as the brake device B2, it becomes possible to reduce drag loss of oil as compared to the case where a frictional brake is used for the brake device B2. When the first speed gear stage is to be maintained, the translational force Fh to the one side in the rotational axis direction may act from the hydraulic piston 33 to the sleeve 14 so that it is possible to prevent translation of the sleeve 14 to the other side in the rotational axis direction from the predetermined engagement position regardless of the condition of the torque acting from the engine to the engagement member 12. In the first speed gear stage, a torque Tp $(=\rho \times Td)$ in the predetermined direction acts on the engagement member 12 by the drive torque Td of the engine at the time of switching ON of the acceleration, and a torque Tn $(=\rho \times Tr)$ in the direction opposite from the predetermined direction acts on the engagement member 12 by the resistive torque Tr of the engine at the time of switching OFF of the acceleration. Because of this, by causing the translational force Fh to act in a manner to satisfy Equation (5), it becomes possible to stably maintain the engaged state of the brake device B2 with a small translational force, regardless of the direction of the torque (ON/OFF of acceleration) acting from the engine to the engagement member 12. As a result, responsiveness of the torque transmission with regard to ON/OFF of the acceleration can be improved.

In the up-shifting from the first speed gear stage to the second speed gear stage, because the translational force Fh is set to 0, the translational force (Fs+ρ×Tr×tan(θ)/r) to the other side in the rotational axis direction acts on the sleeve 14, and thus, the brake device B2 can be disengaged. In this process, by setting the translational force Fh to 0 in advance immediately before switching of the brake device B1 from the disengaged state to the engaged state, it becomes possible to prevent pressing of the hydraulic piston 33 by the sleeve 14 when the sleeve 14 translates to the other side in the rotational axis direction, and to quickly disengage the brake device B2. As a result, responsiveness at the up-shifting can be improved.

In the down-shifting from the second speed gear stage to the first speed gear stage, when the torque Tp in the predetermined direction acts on the engagement member 12, the brake device B2 can be quickly engaged with a small translational force Fh by causing the translational force Fh to act in a manner to satisfy Equation (2), and responsiveness of the down-shifting can be improved. On the other hand, when the torque Tn in the direction opposite from the predetermined direction acts on the engagement member 12, by causing the translational force Fh to act in a manner to satisfy Equation (4), it becomes possible to engage the brake device B2 even when the translational force Fn to the other side (disengagement side) in the rotational axis direction acts on the sleeve 14 by the torque Tn.

In addition, in the reverse gear stage, because the torque Tn (=ρ×Td) in the direction opposite from the predetermined direction acts on the engagement member 12 by the drive torque Td of the engine at the time of switching ON of the acceleration and the torque Tp (=ρ×Tr) in the predetermined direction acts on the engagement member 12 by the resistive torque Tr of the engine at the time of switching OFF of the acceleration, by causing the translational force Fh to act in a manner to satisfy Equation (6), it becomes possible to stably maintain the engaged state of the brake device B2 regardless of the direction of the torque (ON/OFF of acceleration) acting from the engine on the engagement member 12. As a result, responsiveness of torque transmission with regard to ON/OFF of the acceleration can be improved.

A preferred embodiment of the present invention has been described. However, the present invention is not limited to the preferred embodiment, and modifications may be made within the scope and spirit of the present invention.

What is claimed is:

1. An engagement device comprising:
a movable element in which an engagement section is provided;
an engagement element in which a support section that supports the movable element is provided; and
an engaged element in which an engaged section is provided, wherein
a torque from a drive source acts on the engagement element or the engaged element,
the support section supports the movable element in a manner such that the movable element moves to one side in a rotational axis direction corresponding to a relative rotation of the engagement element in a predetermined direction with respect to the movable element,
the engagement device further comprises an engagement force generation device that causes a force to the one side in the rotational axis direction to act on the movable element,
when the movable element is at a predetermined engagement position in the rotational axis direction, the engagement section engages the engaged section and movement of the movable element to the one side in the rotational axis direction with respect to the predetermined engagement position is restrained by a restraining section, and
the engagement force generation device causes, when a state of engagement between the engagement section and the engaged section is maintained, the force to the one side in the rotational axis direction to act on the movable element so that the movable element does not move to the other side in the rotational axis direction with respect to the predetermined engagement position.

2. The engagement device according to claim 1, wherein the support section is provided on the engagement element in an inclined manner in the predetermined direction from the one side in the rotational axis direction toward the other side with respect to the rotational axis direction, and
when the state of engagement between the engagement section and the engaged section is maintained, the force to the one side in the rotational axis direction that the engagement force generation device causes to act on the movable element is greater than Tn×tan (θ)/r, wherein Tn represents a torque in a direction opposite from the predetermined direction acting on the engagement element, r represents a radius of the support section, and θ represents an inclination angle of the support section with respect to the rotational axis direction.

3. The engagement device according to claim 2, wherein when the state of engagement between the engagement section and the engaged section is maintained, a torque in the direction opposite from the predetermined direction is caused to act on the engagement element by a resistive torque of the drive source, and
when the state of engagement between the engagement section and the engaged section is maintained, the force to the one side in the rotational axis direction that the engagement force generation device causes to act on the movable element is greater than ρ×Tr×tan (θ)/r, wherein Tr represents the resistive torque of the drive source, and ρ represents a torque ratio between the engagement element and the drive source.

4. The engagement device according to claim 2, further comprising:
a disengagement force generation device that causes a force to the other side in the rotational axis direction to act on the movable element, wherein
when the state of engagement between the engagement section and the engaged section is maintained, the force to the one side in the rotational axis direction that the engagement force generation device causes to act on the movable element is greater than Fs+Tn×tan (θ)/r, wherein Fs represents a force to the other side in the rotational axis direction that the disengagement force generation device causes to act on the movable element.

5. The engagement device according to claim 3, further comprising:

a disengagement force generation device that causes a force to the other side in the rotational axis direction to act on the movable element, wherein when the state of engagement between the engagement section and the engaged section is maintained, the force to the one side in the rotational axis direction that the engagement force generation device causes to act on the movable element is greater than $Fs+Tn\times\tan(\theta)/r$, wherein Fs represents a force to the other side in the rotational axis direction that the disengagement force generation device causes to act on the movable element.

6. An automatic transmission which gear-changes a motive power from a drive source and outputs the motive power, and in which a gear stage can be selected from among a plurality of gear stages, comprising:

a brake device that allows or restrains rotation of a rotational member to which a torque from the drive source acts, wherein the brake device restrains the rotation of the rotational member at a first gear stage among the plurality of gear stages and allows the rotation of the rotational member at a second gear stage among the plurality of gear stages, the brake device is the engagement device according to claim 1, one of the engagement element and the engaged element is connected to the rotational member, and a rotation of the other of the engagement element and the engaged element is fixed, and when the first gear stage is maintained, the engagement force generation device causes the force to the one side in the rotational axis direction to act on the movable element such that the movable element does not move to the other side in the rotational axis direction with respect to the predetermined engagement position.

* * * * *